United States Patent
Liu et al.

(10) Patent No.: US 10,848,603 B2
(45) Date of Patent: *Nov. 24, 2020

(54) FOLDABLE MOBILE DEVICE

(71) Applicant: Futurewei Technologies, Inc., Plano, TX (US)

(72) Inventors: Huixiang Liu, Cupertino, CA (US); Yuehui Ouyang, Sunnyvale, CA (US); Yiwen Gong, Cupertino, CA (US); Peng Xiong, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,299

(22) Filed: Feb. 14, 2019

(65) Prior Publication Data

US 2019/0245954 A1    Aug. 8, 2019

Related U.S. Application Data

(63) Continuation of application No. 15/794,874, filed on Oct. 26, 2017, now Pat. No. 10,230,826.

(60) Provisional application No. 62/548,780, filed on Aug. 22, 2017.

(51) Int. Cl.
*H04M 1/02*    (2006.01)

(52) U.S. Cl.
CPC .................. *H04M 1/0214* (2013.01)

(58) Field of Classification Search
CPC .................................................. H04M 1/0214
See application file for complete search history.

(56) References Cited

U.S. PATENT DOCUMENTS

| 7,184,808 | B2 | 2/2007 | Shoji |
| 9,504,170 | B2 | 11/2016 | Rothkopf et al. |
| 10,230,826 | B1 * | 3/2019 | Liu ..................... H04M 1/0214 |
| 2008/0316113 | A1 | 12/2008 | Nakasato et al. |
| 2009/0005134 | A1 | 1/2009 | Abdul-Gaffoor et al. |
| 2009/0005314 | A1 | 1/2009 | Lin et al. |
| 2010/0013720 | A1 | 1/2010 | Sakata et al. |
| 2013/0010405 | A1 | 1/2013 | Rothkopf et al. |

(Continued)

FOREIGN PATENT DOCUMENTS

| CN | 1510885 A | 7/2004 |
| CN | 101015088 A | 8/2007 |

(Continued)

*Primary Examiner* — Nguyen T Vo
(74) *Attorney, Agent, or Firm* — Slater Matsil, LLP

(57) ABSTRACT

An embodiment of the disclosure involves a foldable mobile device. The foldable mobile device includes a housing having a first portion and a second portion foldable around a folding axis of the housing to allow a folded state of the device; an antenna operatively assembled to the housing; and a display mounted on a front side of the first portion and a front side of the second portion. The first portion has a first plate configured on a back side of the first portion opposite to the front side of the first portion, a contacting structure defined on the first plate. The second portion has a second plate configured on a back side of the second portion opposite to the front side of the second portion. When the mobile device operates is folded, the first plate and the second plate are conductively coupled with each other via the contacting structure.

22 Claims, 14 Drawing Sheets

(56) References Cited

U.S. PATENT DOCUMENTS

| | | | |
|---|---|---|---|
| 2013/0241795 A1 | 9/2013 | Sung et al. | |
| 2013/0321340 A1 | 12/2013 | Seo et al. | |
| 2015/0355791 A1 | 12/2015 | Hidaka | |
| 2017/0187093 A1 | 6/2017 | Svendsen | |
| 2018/0039410 A1 | 2/2018 | Kim et al. | |
| 2018/0358687 A1* | 12/2018 | Cho | H01Q 7/00 |
| 2020/0068054 A1 | 2/2020 | Kim et al. | |

FOREIGN PATENT DOCUMENTS

| | | |
|---|---|---|
| CN | 103326105 A | 9/2013 |
| CN | 106711579 A | 5/2017 |
| EP | 3343693 A1 | 7/2018 |
| WO | 2017099377 A1 | 6/2017 |

\* cited by examiner

FOLDABLE MOBILE DEVICE

CROSS-REFERENCE TO RELATED APPLICATIONS

This is a continuation application of U.S. application Ser. No. 15/794,874, filed on Oct. 26, 2017 entitled "A Foldable Mobile Device," which claims the benefit of U.S. Provisional Application No. 62/548,780, filed on Aug. 22, 2017, entitled "A Foldable Mobile Device," which applications are hereby incorporated herein by reference.

BACKGROUND

A foldable mobile phone may incorporate a chassis or device housing which can be folded/unfolded. The foldable mobile phone may contain processors, sensors and other typical smartphone circuitry. For example, a foldable mobile phone might include antennas, cameras, display controllers, speaker modules and light sensors, microphones, CPU and GPU, vibrator and other necessary parts. The foldable mobile phone may further incorporate a flexible display to resize the display area depending whether the phone is folded or unfolded. The display area may be increased when the mobile phone is unfolded. Typically, a folded mobile phone offers a user convenience for carrying around in a small form factor.

SUMMARY

According to one aspect of the present disclosure, there is provided a foldable mobile device comprising a housing having a first portion and a second portion foldable around a folding axis of the housing to allow a folded state of the device, an antenna operatively assembled to the housing; and a display mounted on a front side of the first portion and a front side of the second portion. The first portion has a first plate configured on a back side of the first portion opposite to the front side of the first portion and a first contacting structure. The second portion has a second plate configured on a back side of the second portion opposite to the front side of the second portion. When the mobile device operates in the folded state, the first plate and the second plate are conductively coupled with each other via the first contacting structure.

Optionally, in any preceding aspects, another implementation of the aspect provides that the first contacting structure is configured to substantially separate the antenna from electromagnetic lossy mode resonance existing between the first plate and the second plate when the mobile device is folded.

Optionally, in any preceding aspects, another implementation of the aspect provides that the first contacting structure is configured to reduce the electromagnetic lossy mode resonance existing between the first plate and the second plate when the mobile device is folded.

Optionally, in any preceding aspects, another implementation of the aspect provides that the first plate and the second plate are made of conductive material.

Optionally, in any preceding aspects, another implementation of the aspect provides that the display includes a flexible display having a first displaying area on the front side of the first portion and a second displaying area on the front side of the second portion. The flexible display provides both the first displaying area and the second displaying area substantially on a flat surface when the foldable mobile device is in an unfolded state.

Optionally, in any preceding aspects, another implementation of the aspect provides that the display includes two physically separate displaying screens.

Optionally, in any preceding aspects, another implementation of the aspect provides that when the foldable mobile device is in the folded state, the display are physically visible from outside of the foldable mobile device.

Optionally, in any preceding aspects, another implementation of the aspect provides that the first contacting structure includes one or more conductive pins configured over the first plate according to a pattern, and a distance between two neighboring conductive pins is limited by a threshold separation.

Optionally, in any preceding aspects, another implementation of the aspect provides that the threshold separation is less than 15 mm.

Optionally, in any preceding aspects, another implementation of the aspect provides that the first contacting structure includes one or more conductive bars.

Optionally, in any preceding aspects, another implementation of the aspect provides that an outer surface of the first plate is substantially covered by a first layer of non-conductive material, and an outer surface of the second plate is substantially covered by a second layer of non-conductive material.

Optionally, in any preceding aspects, another implementation of the aspect provides that a side of the second plate is configured with a conductive area to be in contact with the first contacting structure to conductively couple the first plate with the second plate when the device is in the folded state.

Optionally, in any preceding aspects, another implementation of the aspect provides that a second contacting structure of the second plate and the conductive area is provided by the second contacting structure.

Optionally, in any preceding aspects, another implementation of the aspect provides that the first plate covers substantially the back side of the first portion and the second plate covers substantially the back side of the second portion.

Optionally, in any preceding aspects, another implementation of the aspect provides that the first portion and the second portion respectively include a first magnet block and a second magnet block. The first magnet block and the second magnet block are configured to magnetically position the first plate and the second plate for the conductive coupling when the foldable mobile device is in the folded state.

Optionally, in any preceding aspects, another implementation of the aspect provides that the first contacting structure is substantially inside the first portion when the foldable mobile device operates in an unfolded state.

According to one aspect of the present disclosure, there is provided a foldable mobile device comprising a housing, an antenna and a display. The housing has a first portion and a second portion foldable around a folding axis of the housing to allow a folded state of the device, where a first conductive plate is configured on a back side of the first portion, the first conductive plate is substantially covered by a first layer of non-conductive material, and where a second conductive plate is configured on a back side of the second portion, the second conductive plate is substantially covered by a second layer of non-conductive material. The antenna is operatively assembled to the housing. The display is mounted on a front side of the first portion and a front side of the second portion, the front side of the first portion opposite to the backside of the first portion, the front side of the second portion opposite to the back side of the second portion, where when the mobile device operates in the folded state, the first layer and the second layer are sandwiched between the first plate and the second plate which have a separation distance configured to substantially limit presence of electromagnetic lossy mode resonance for performance of the antenna.

Optionally, in any preceding aspects, another implementation of the aspect provides that the separation distance between the first plate and the second plate is substantially equal to a sum of a value of thickness of the first layer and a value of thickness of the second layer.

Optionally, in any preceding aspects, another implementation of the aspect provides that the separation distance is no more than 0.3 mm.

Optionally, in any preceding aspects, another implementation of the aspect provides that the separation distance is no more than 0.2 mm.

Optionally, in any preceding aspects, another implementation of the aspect provides that the separation distance is no more than 0.1 mm.

Optionally, in any preceding aspects, another implementation of the aspect provides that the first plat and the second plate are conductively connected in the folded state, where the first portion and the second portion respectively include a first magnet block and a second magnet block, where the first magnet block and the second magnet block are configured to magnetically position the first plate and the second plate for the conductive connection in the folded state.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
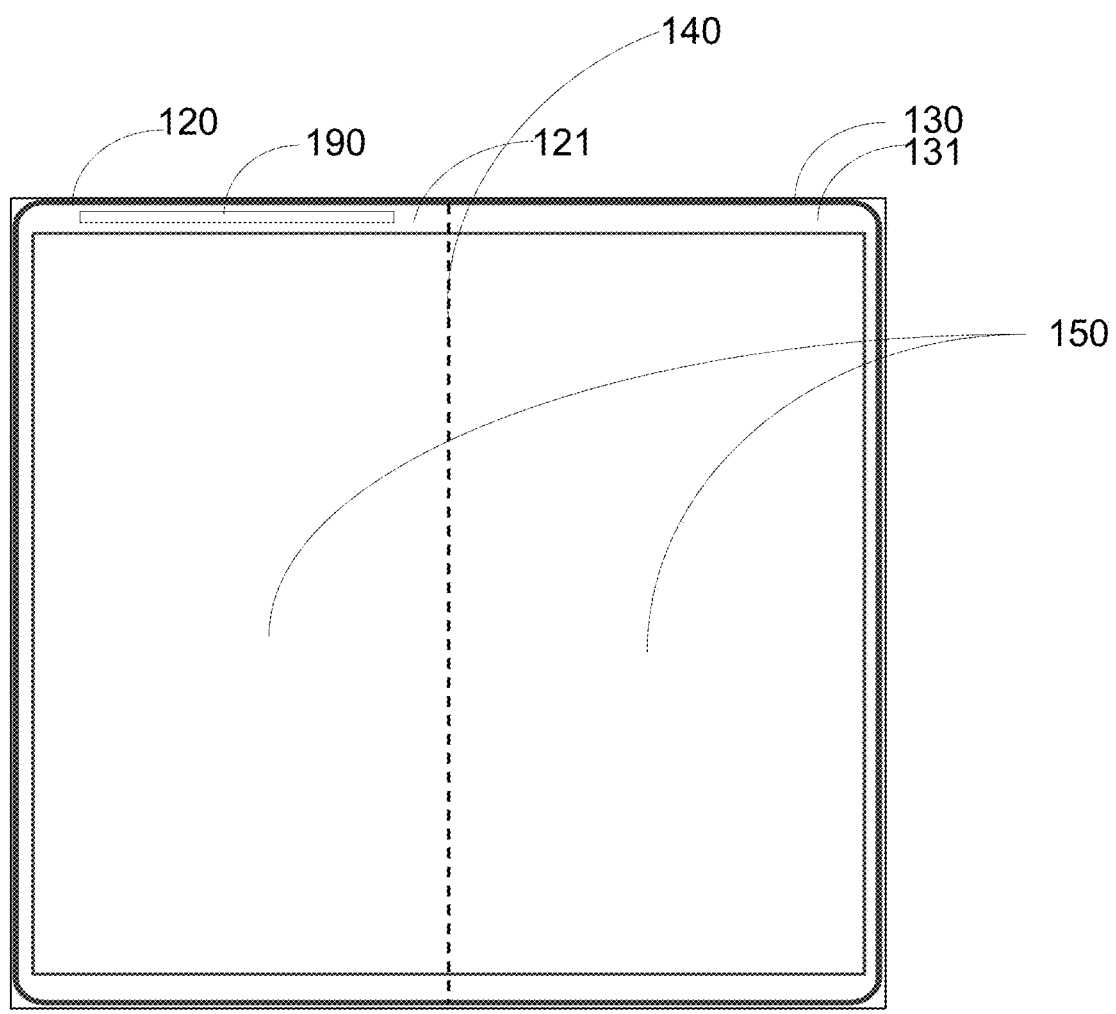
FIG. 1 illustrates a front view of a foldable mobile device when it is unfolded according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In some embodiments, a foldable mobile device can include a first portion and a second portion, where a first plate is configured on the back side of the first portion and a second plate is configured on the back side of the second portion. In some embodiments, the first plate covers substantially the back side of the first portion and the second plate covers substantially the back side of the second portion. Furthermore, a first contacting structure may be defined on the first plate. The first plate, the second plate and the first contacting structure are all conductive. Therefore, the first plate and the second plate may be conductively coupled with each other via the first contacting structure. The first contacting structure forms a protrusion no matter the foldable mobile phone is in a folded state or in an unfolded state. In some embodiments, the first contacting structure forms one or more protrusions when the foldable mobile phone is in the folded state and goes into the first portion when the foldable mobile phone is in the unfolded state. The first contacting structure may include one or more conductive pins or conductive bars.

When the mobile device is folded, the first plate and the second plate are conductively coupled (e.g. electrically connected or shorted) with each other via the first contacting structure. In some embodiments, either of the first plate and the second plate is covered with a non-conductive (or insulated) layer, where the non-conductive layer may be used to prevent or protect the plate from external physical damage. In some embodiments, each of the first plate and the second plate is covered with a non-conductive layer covering a portion or substantially (e.g. on one side, or the back side) of the plate. The non-conductive layer may be configured not to prevent the conductive coupling between the first plate and the second plate. In one example, the first contacting structure is defined on the first plate and electric currency may flow between the first contacting structure and the first plate no matter the surface of the first contacting structure and the first plate is covered by the non-conductive layer. Furthermore, a contacting area of the second plate is not covered by a non-conductive layer and a contacting point of the first contacting structure is not covered by a non-conductive layer, where the contacting point is used to connect the contacting structure and the second plate when the mobile device is folded. In such a scenario, when the mobile device is folded, the contacting structure may conductively contact the second plate via the contacting point and the contacting area and conductively couples the first plate and the second plate.

In an example of the disclosure, electromagnetic lossy mode resonance (e.g. a specific kind of electromagnetic resonance phenomena which might impact antenna performance of the foldable device) can exist between two plates of a foldable device when the two plates are close by but not conductively coupled with each other. In this embodiment, because the first plate and the second plate are conductively coupled with each other, there is no or little electromagnetic lossy mode resonance between the first plate and the second plate. Consequently, the adverse impact caused by the electromagnetic lossy mode resonance to the performance of the antenna of the mobile device is eliminated.

In some embodiments, the foldable mobile device does not have the contacting structure, but each of the two plates is covered by a non-conductive layer. When the foldable mobile device is folded, the two non-conductive layers are sandwiched between the first plate and the second plate. The first plate and the second plate have a separation distance configured to substantially limit the presence of electromagnetic lossy mode resonance for performance of the antenna in the mobile device.

Figure 2:
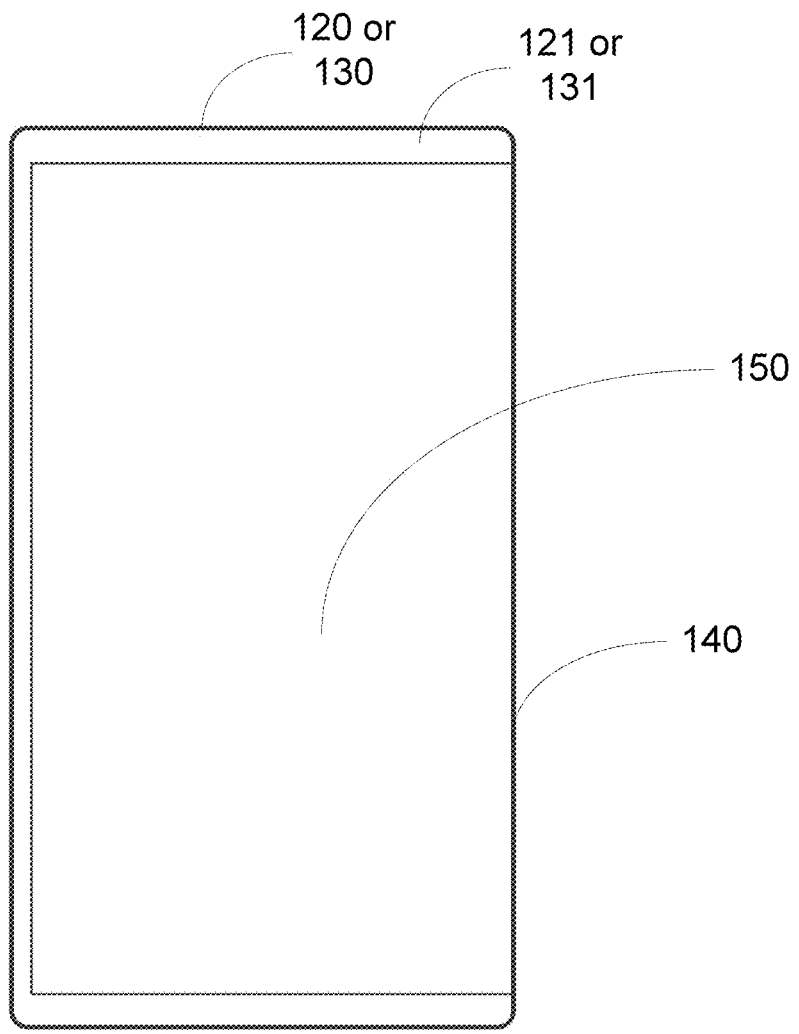
FIG. 2 illustrates a front view of a foldable mobile device when it is folded according to an embodiment of the disclosure.

FIG. 1 and FIG. 2, according to an example of the disclosure, respectively illustrate a front view of a foldable mobile device 100 when it is folded (or in a folded state) and a front view of device 100 when it is unfolded (or in an unfolded state).

Referring to FIG. 1, device 100 may be a mobile phone, a mobile tablet and any mobile foldable electronics device. Device 100 may include a housing having a first portion 120 and a second portion 130. First portion 120 and second portion 130 may be configured with substantially similar sizes, shapes and thickness. First portion 120 and second portion 130 may be configured with different sizes, shapes or other applicable physical characteristics. The first and the second portions 120, 130 are foldable around a folding axis 140 of the housing. First and second portions 120, 130 may be rotatably configured around the folding axis 140 to allow the foldable mobile device operate in a folded mode or an unfolded mode.

Device 100 may further include an antenna 190 assembled to the housing. The antenna may be assembled in the first portion 120 as illustrated in FIG. 1, or be assembled in the second portion 130 (not shown). Furthermore, the antenna may be assembled (e.g. configured or positioned) partially in the first portion 120 and partially in the second portion 130 (not shown). The antenna is assembled along one or more edges of the first portion 120. The antenna may be assembled along one or more edges of the second portion 130. Moreover, the foldable mobile device includes a display 150 mounted on a front side 121 of the first portion 120 and a front side 131 of the second portion 130. The display 150 may include a flexible display having two displaying areas. The display 150 may be based on an electronic ink display, an organic light-emitting diode display, or other suitable flexible displays. The display 150 include two or more physically separate displaying screens. Each of the separate displaying screens may be flexible or non-flexible. Based on the control of a processor in the mobile device, the two or more physically separate displaying screens may cooperate with each other to display one picture or one video. The physically separate displaying screens may be based on an electronic ink display and led. When the foldable mobile device is in the folded state, the display are physically visible from outside of the foldable mobile device.

Figure 3:
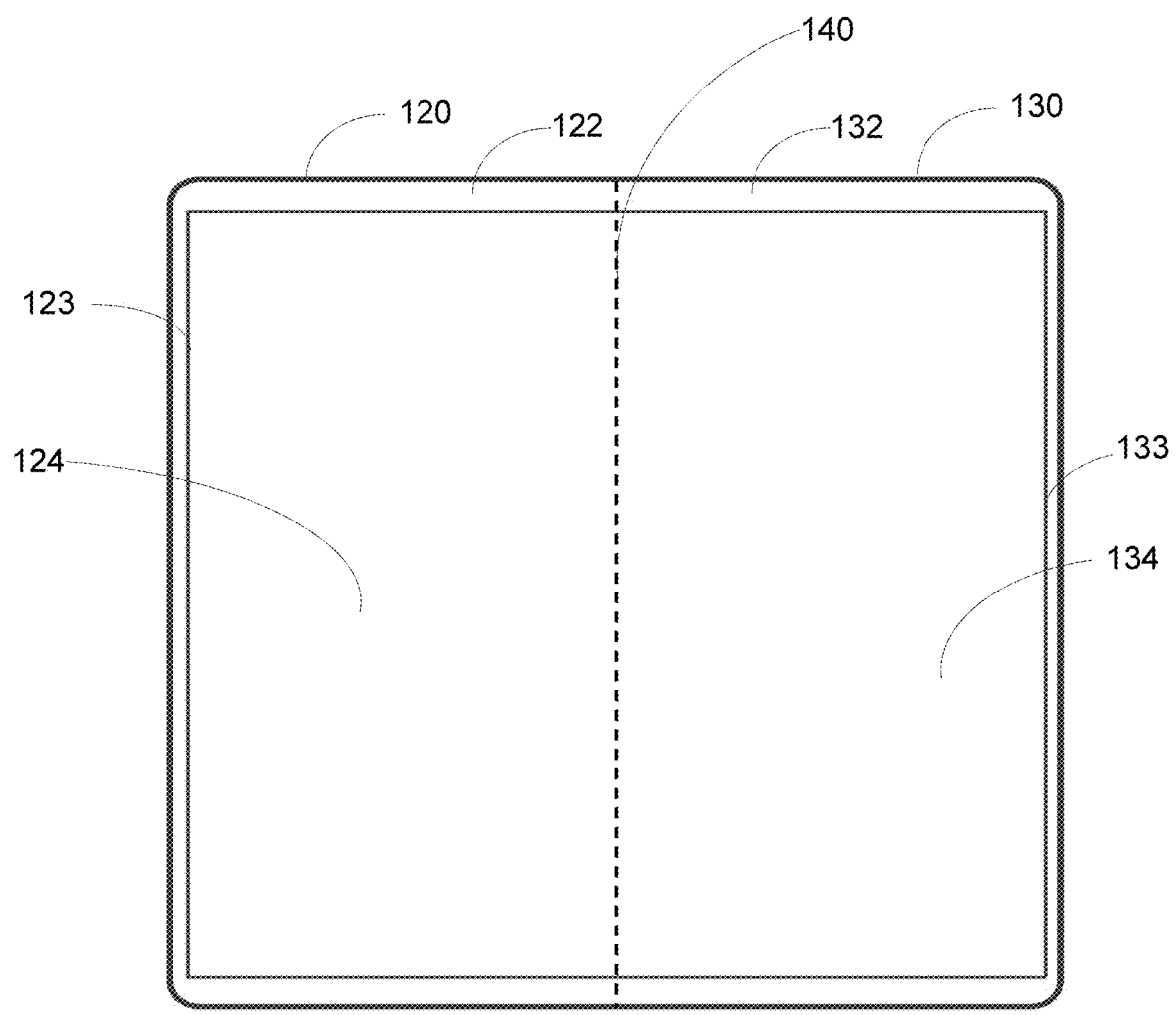
FIG. 3 illustrates a rear view of the foldable mobile device when it is unfolded according to an embodiment of the disclosure.

FIG. 3 illustrates a rear view of device 100 operating in an unfolded mode or state according to an example of the disclosure. The first portion 120 may include a first plate 123 configured on a rear side or back side 122 of the first portion 120. First plate 123 may be made of conductive material. Front side 121 (not illustrated in FIG. 3) of device 100, as illustrated in FIG. 1 and FIG. 2, of the first portion 120 is opposite to the back side 122 of the first portion 120. The front side 121 of the first portion 120 and the back side 122 of the first portion 120 may be substantially parallel to each other when device 100 operates in a folded mode. Similarly, the foldable mobile device includes a second plate 133 configured on a back side 132 of the second portion 130. Second plate 133 may be made of conductive material.

Front side 131, not illustrated in FIG. 3 but illustrated in FIG. 1 and FIG. 2, and back side 132 form two opposite sides of the second portion 130. Front side 131 may be substantially parallel with back side 132 of the second portion 130. Each or either of the outer surface of first plate 123 and the front surface of second plate 133 is substantially covered with a non-conductive layer. For example, non-conductive layer 124 may cover first plate 123 and likewise non-conductive layer 134 may cover second plate 133. A non-conductive layer covering an outer surface of a plate may include a protective oxide layer preventing the plate from damage caused by physical damage. When foldable mobile device 100 is folded or in a folded mode, non-conductive layer 124 and non-conductive layer 134 may be directly adjacent to and conductively in physical contact with each other. The outer surface of the first plate 123 and the outer surface of the second plate 133 can be sized to substantially cover each other when device 100 is in a folded mode.

Figure 4:
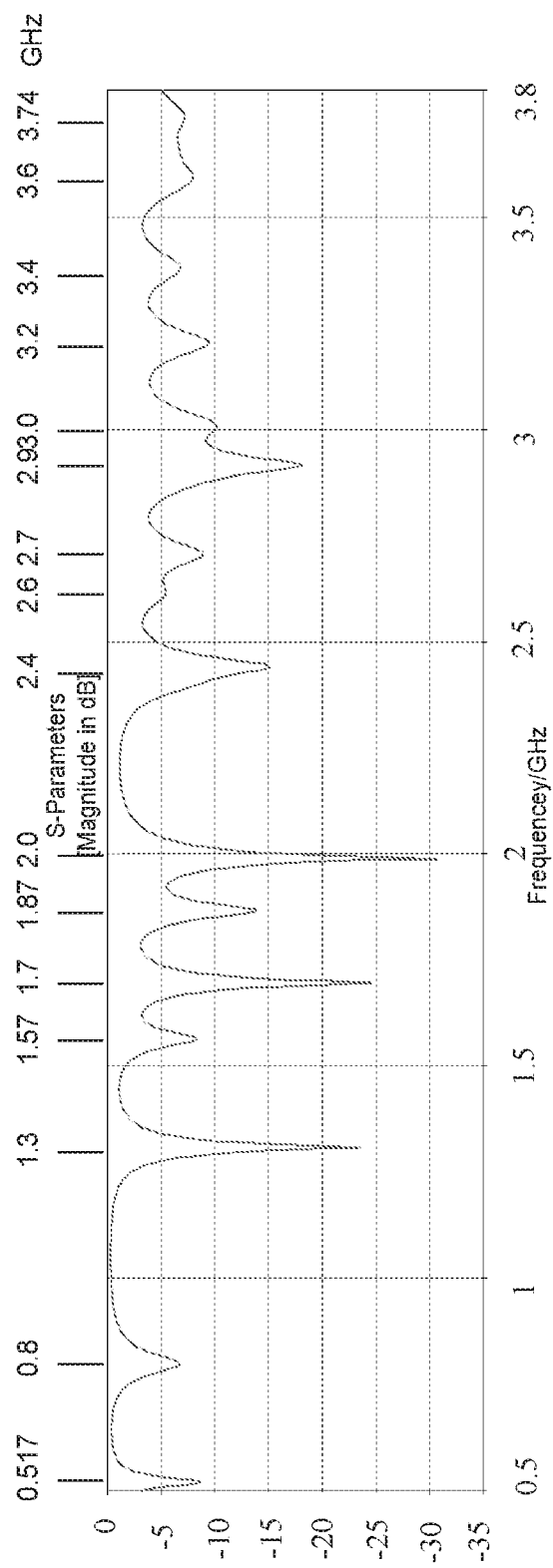
FIG. 4 illustrates effects of electromagnetic lossy mode resonance of a foldable mobile device when it is folded according to an example of the disclosure.

When the foldable mobile device is folded, some electromagnetic lossy mode resonance may be generated between the first plate 123 and the second plate 133. FIG. 4 illustrates effects of electromagnetic lossy mode resonance of a foldable mobile device according to the example of the disclosure. As shown, up to 15 lossy modes exist in the cellular frequency bands (700 MHz to 3.8 GHz). The electromagnetic lossy mode resonance will adversely affect the performance of the antenna in the foldable mobile device. It is important to mitigate the adverse effects to ensure good antenna radiation efficiency.

In some embodiments, in order to separate the antenna from the lossy modes, a contacting structure may be defined on the outer surface of first plate 123. The contacting structure may be made of conductive material, such as metal. When foldable mobile device 100 is folded, the contacting structure may conductively couple the first plate 123 with the second plate 133.

The second plate 133 may have conductive areas which are not covered with the second layer 134. The conductive areas of second plate 133 and the contacting structure of first plate 123 may be configured to allow each pin or bar of the contacting structure to be in physical contact with one conductive area.

The first contacting structure may physically and conductively contact the conductive area when the foldable mobile device is folded. The conductive contact of the contacting structure and the conductive area makes the first plate 123 and the second plate 133 conductively coupled with each other when the foldable mobile device 100 is folded. As a result, the difference between the voltage values or levels of the first plate 123 and the second plate 133 can be significantly reduced to be close to substantially the same as zero to mitigate the electromagnetic lossy mode resonance between the first plate and the second plate. Consequently, the adverse effect caused by the electromagnetic lossy mode resonance to the antenna is eliminated.

In some embodiments, a second contacting structure is defined on the second plate 133. The second contacting structure is made of the conductive material. In some embodiments, the second contacting structures may be considered as a portion of the second plate 133. In some embodiments, the second contacting structure is defined in the conductive area which is not covered with the second layer 134. When the foldable mobile device is folded, the first contacting structure and the second contacting structure can be in contact with each other so that the first plate 123 and the second plate 133 are conductively coupled with each other.

Figure 5:
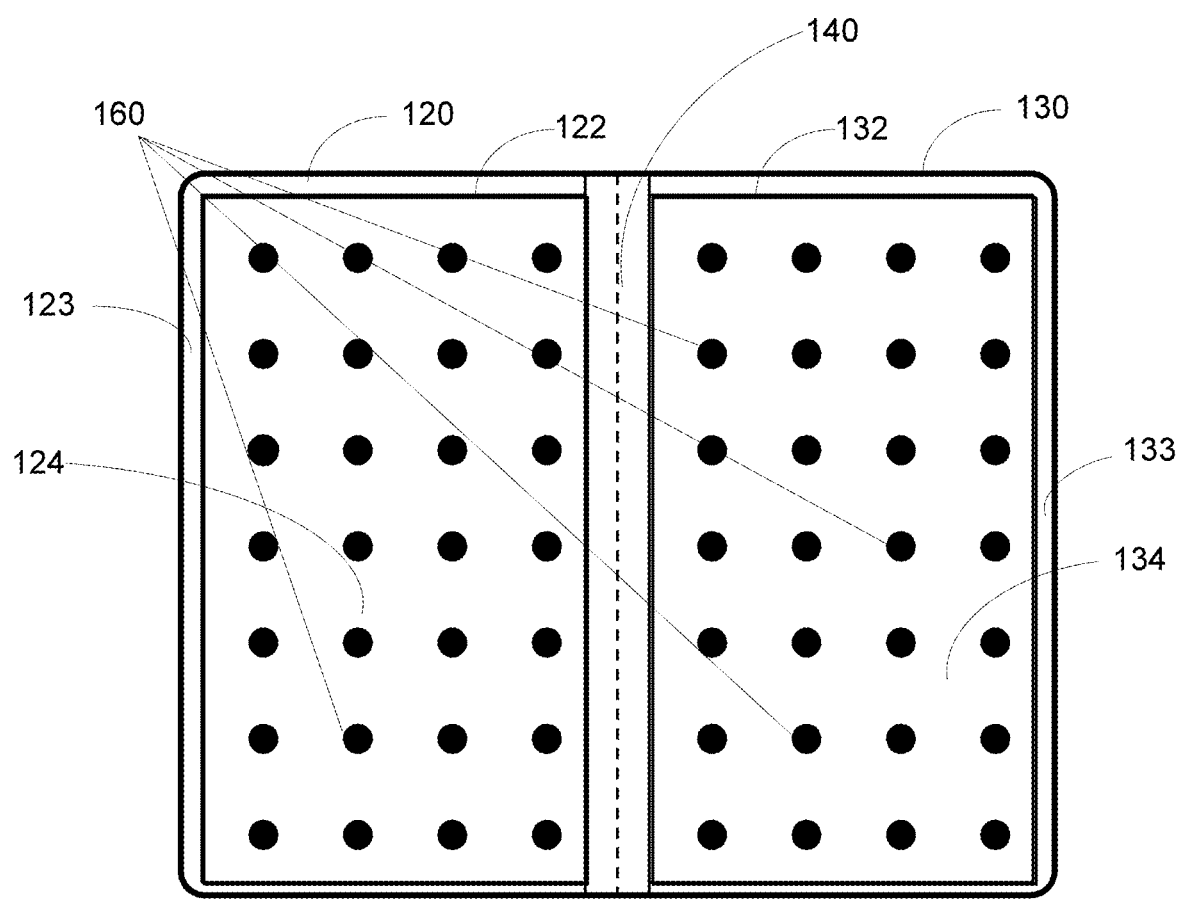
FIG. 5 illustrates a rear view of the foldable mobile device when it is unfolded according to an embodiment of the disclosure.

FIG. 5 illustrates a rear view of a foldable mobile device when it is unfolded according to an embodiment of the disclosure. When the foldable mobile device as illustrated in FIG. 5 is in the unfolded state, its front view may be the same as the front view as illustrated in FIG. 1. When the foldable mobile device as illustrated in FIG. 5 is in the unfolded state, its front view may be the same as the front view as illustrated in FIG. 2. As illustrated in FIG. 5, a plurality of pins 160 are respectively defined on the first plate 123 and the second plate 133 as a first contacting structure on the first plate 123 and a second contacting structure on the second plate 133. The plurality of pins 160 may be arranged in a certain pattern or design to allow substantially or partially separate or isolate the antenna (not shown in FIG. 5) from some lossy mode resonance existing between the first plate 123 and the second plate 133 so that the lossy mode resonance cannot adversely affect the performance of the antenna. For example, the arrangement of pins 160 may be in a form of multiple lines, circles or other applicable forms or patterns.

In some embodiments, the multiple lines are evenly arranged on the first plate 123. The distance between two neighboring lines may be called as step or threshold separation. The step may be less than 15 mm, 12 mm, 10 mm or 8 mm. In some embodiments, the threshold separation (distance) between two neighboring pins on the first plate 123 may be less than 15 mm, 12 mm, 10 mm or 8 mm. When there are more lines of pins, the effect of separating the antenna from the electromagnetic lossy mode resonance may be better.

In some embodiments, as illustrated by FIG. 5, the plurality of pins 160 covers the outer surface of first plate 123 and the outer surface of the second plate 133 and a non-conductive layer covers the outer surface of first plate 123 and the outer surface of the second plate 133 except the area at which the plurality of pins 160 are defined.

In some embodiments, for some neighboring pins 160 in the line, the distance between any two neighboring pins is less than 15 mm, 12 mm, 10 mm or 8 mm. In some embodiments, the average distance between two neighboring pins 160 in the line is less than 15 mm, 12 mm, 10 mm or 8 mm. Although the lines of pins 160 are substantially straight in FIG. 5, the lines of pins 160 may be in a curve shape in some embodiments.

Figure 6:
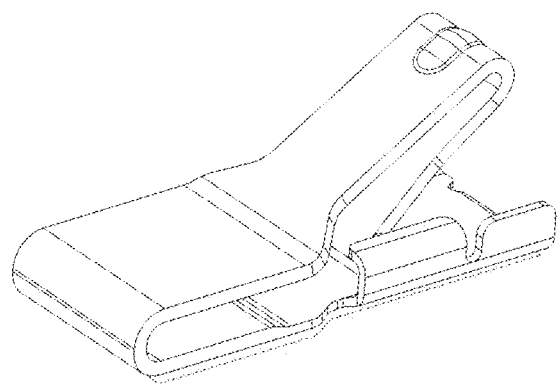
FIG. 6 illustrates an exemplary metal spring for a foldable device according to an embodiment of the disclosure.
Figure 7:
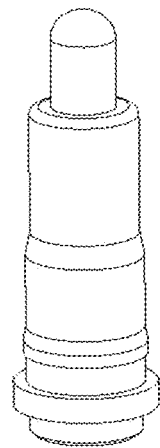
FIG. 7 illustrates an exemplary pogo pin for a foldable device according to an embodiment of the disclosure.
Figure 8:
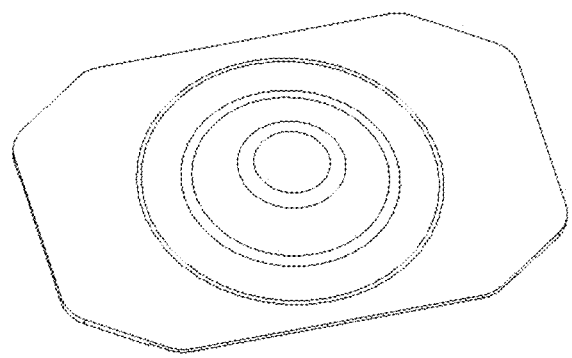
FIG. 8 illustrates an exemplary metal pin for a foldable device according to an embodiment of the disclosure.

FIG. 6 illustrates a metal spring according to an embodiment of the disclosure. FIG. 7 illustrates a pogo pin according to an embodiment of the disclosure. FIG. 8 illustrates a metal pin according to an embodiment of the disclosure. The pins 160 may include metal springs as illustrated in FIG. 6. In some embodiments, the pins 160 may include pogo pins as illustrated in FIG. 7. In some embodiments, the pins 160 may include metal pins as illustrated in FIG. 8.

Figure 9:
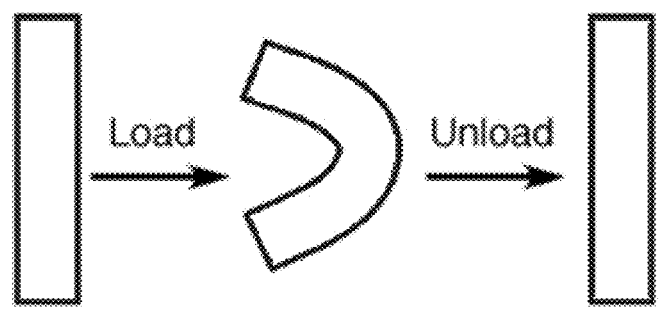
FIG. 9 illustrates elasticity of memory metal to allow foldability of a device according to an embodiment of the disclosure.

FIG. 9 illustrates the recovery of deformed memory metal according to an embodiment of the disclosure. In some embodiments, the pins 160 may be made of the memory metal. The memory metal, also called shape-memory alloy, is an alloy that "remembers" its original shape and could return to its pre-deformed shape (original shape) after the removal of strains or when heated. As illustrated in FIG. 9, for some memory metal associated with strains, when pressure is loaded to the memory metal, the shape of the memory metal changes. When the pressure is unloaded, the shape of the memory metal changes back to its original shape.

Figure 10:
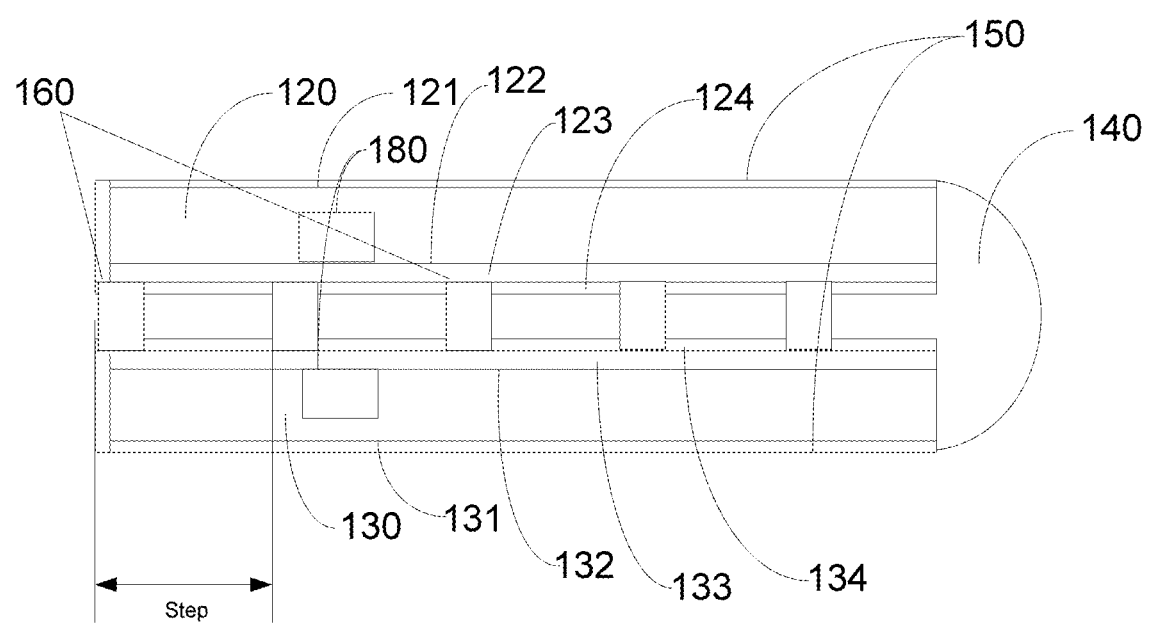
FIG. 10 illustrates a side view of the foldable mobile device when it is folded according to an embodiment of the disclosure.

FIG. 10 illustrates a side view of the foldable mobile device when it is folded according to an embodiment of the disclosure. The first portion 120 and the second portion 130 respectively include a first magnet block 180 and a second magnet block 180, which are configured to magnetically position the first plate 120 and the second plate 130 together for the conductive coupling when the foldable mobile device is in the folded state.

Figure 11:
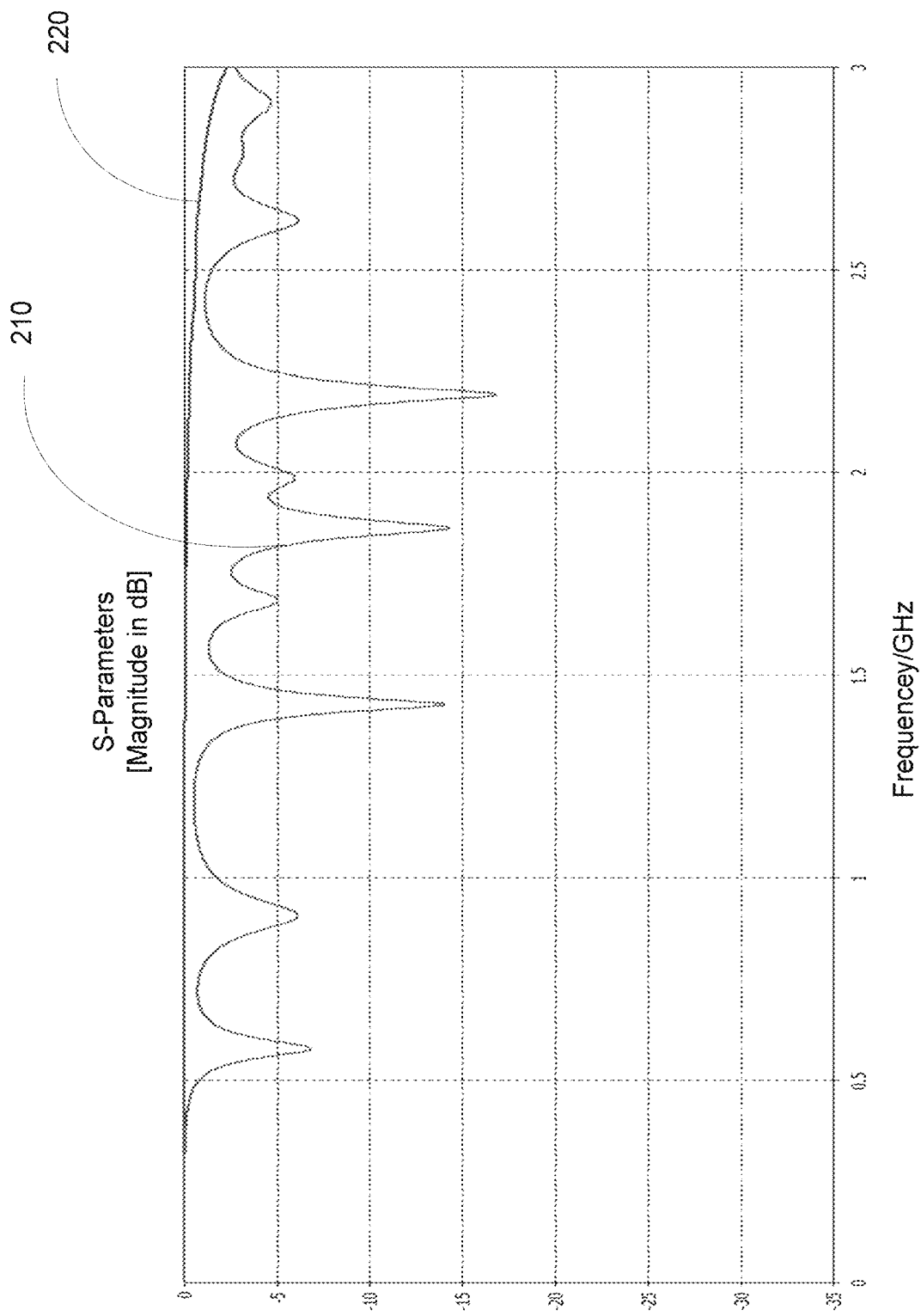
FIG. 11 illustrates exemplary effects of mitigated electromagnetic lossy mode resonance according to an embodiment of the disclosure.

FIG. 11 illustrates exemplary effects of mitigated electromagnetic lossy mode resonance according to an embodiment of the disclosure. The electromagnetic lossy mode resonance of mobile device illustrated in FIG. 3 (without mitigation) is illustrated by line 210 and the mitigated electromagnetic lossy mode resonance of the mobile device illustrated by FIG. 5 and/or FIG. 10 (with mitigation) is illustrated by line 240. As illustrated in FIG. 11, the electromagnetic lossy mode resonance of the mobile device illustrated by FIG. 5 and/or FIG. 10 is sharply mitigated.

In some embodiments, folding axis 140 may include a spring and a washer which may provide pressure to the first plate 120 and the second plate 130 for the conductive coupling when the foldable mobile device is in the folded state. In some embodiments, folding axis 140 further includes a passive cam and an active cam which may provide a detent function (e.g. to mechanically resist or arrest the rotation of a wheel, axle, or spindle etc.) when the first plate 120 and the second plate 130 is set to a certain angle so that the first plate 120 and the second plate 130 is positioned for the conductive coupling when the foldable mobile device is in the folded state.

Figure 12:
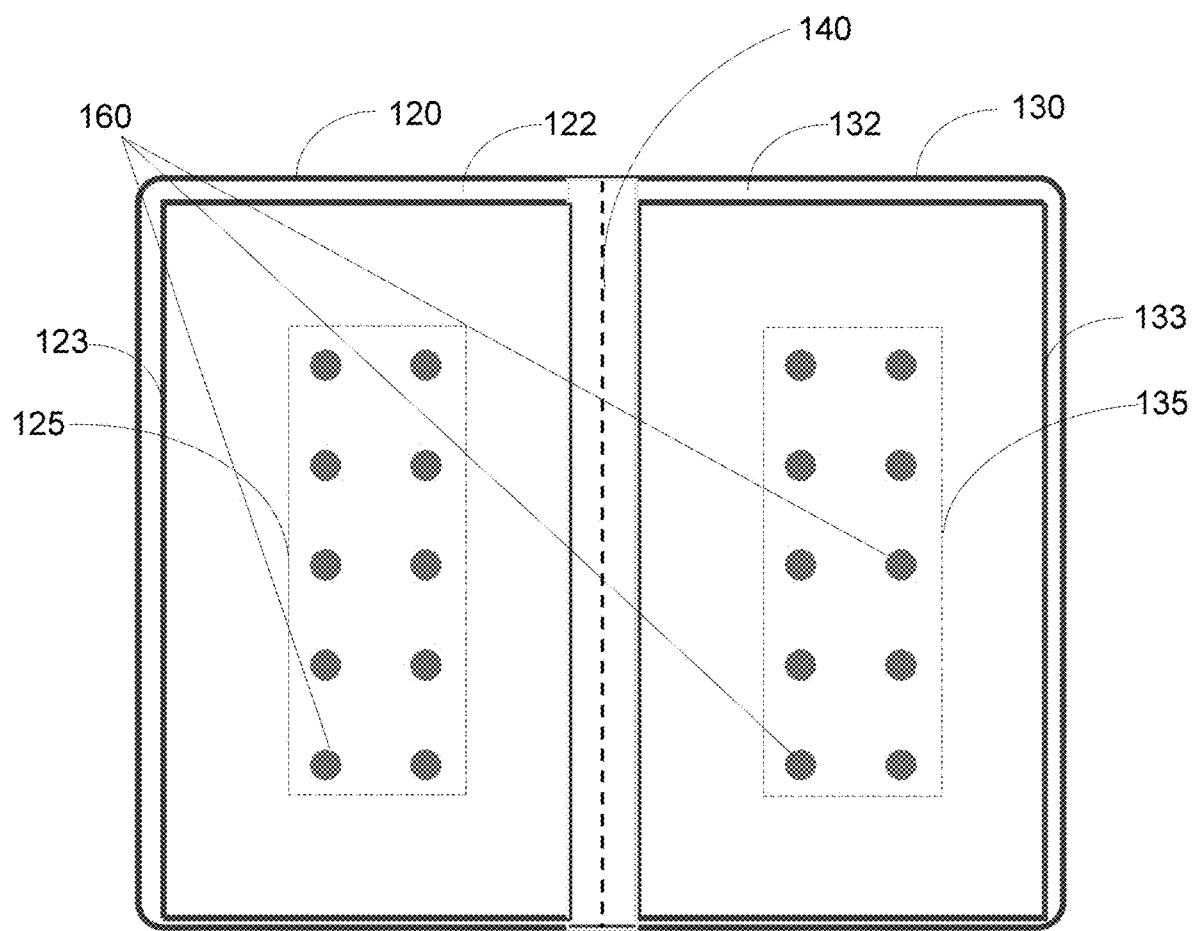
FIG. 12 illustrates a rear view of a foldable mobile device when it is folded according to an embodiment of the disclosure.

FIG. 12 illustrates a rear view of a foldable mobile device when it is folded according to an embodiment of the disclosure. When the foldable mobile device as illustrated in FIG. 12 is in the unfolded state, its front view may be the same as the front view as illustrated in FIG. 1. When the foldable mobile device as illustrated in FIG. 12 is in the folded state, its front view may be the same as the front view as illustrated in FIG. 2. As illustrated in FIG. 12, a plurality of pins 160 covers a portion of the outer surface of first plate 123, such as the area inside the dotted rectangle 125, and a portion of the outer surface of the second plate 133, such as the area inside the dotted rectangle 135. The pins on the first plate 123 may be a contacting structure and the pins on the second plate 133 may be another contacting structure. In some embodiments, the area inside the dotted rectangle 125 and the area inside the dotted rectangle 135 are not covered with a non-conductive layer. In some embodiments, the area outside the dotted rectangle 125 and the area outside the dotted rectangle 135 are covered with a non-conductive layer. When the foldable mobile device as illustrated in FIG. 12 is folded, the pins on the first plate 123 and the pins on the second plate 133 may be connected with each other so that the first plate 123 and the second plate 133 are conductively coupled with each other.

Figure 13:
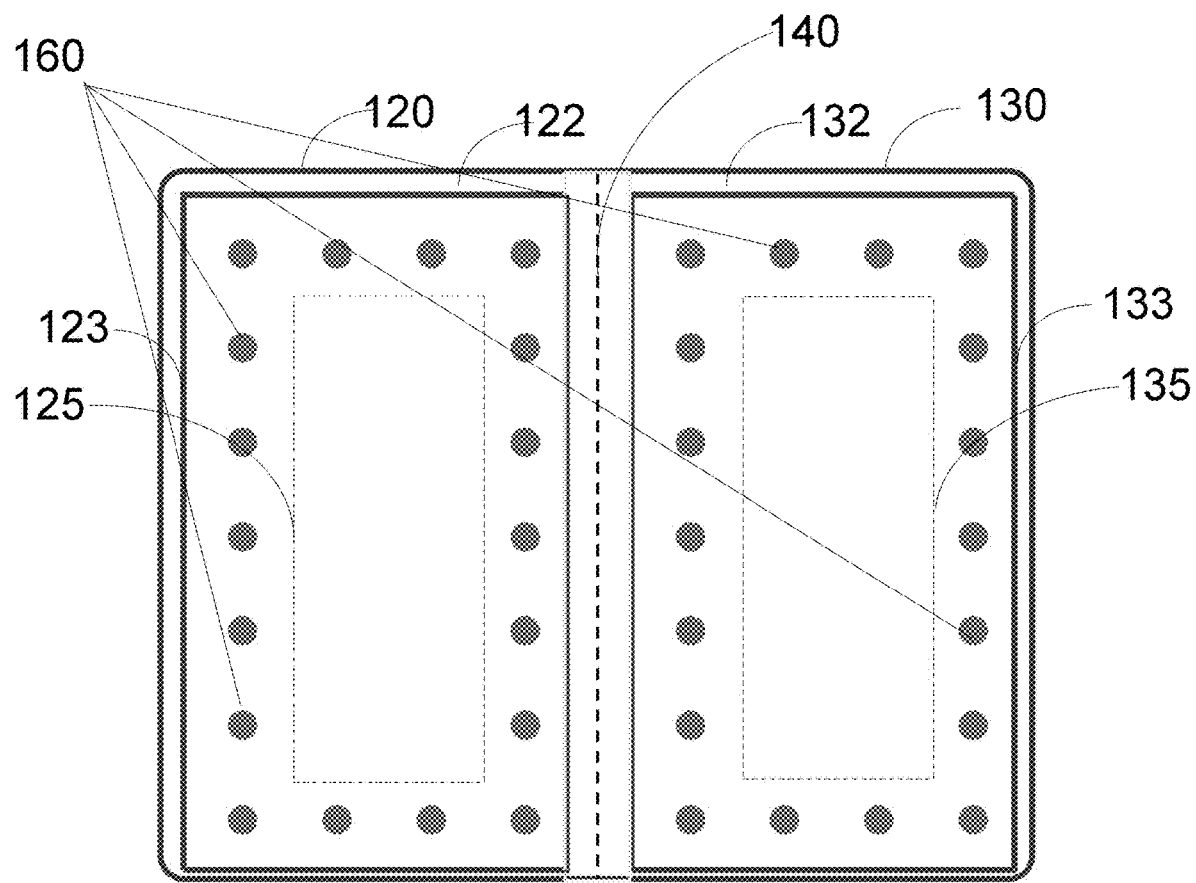
FIG. 13 illustrates a rear view of a foldable mobile device when it is unfolded according to an embodiment of the disclosure.

FIG. 13 illustrates a rear view of a foldable mobile device when it is unfolded according to an embodiment of the disclosure. When the foldable mobile device as illustrated in FIG. 13 is in the unfolded state, its front view may be the same as the front view as illustrated in FIG. 1. When the foldable mobile device as illustrated in FIG. 13 is in the folded state, its front view may be the same as the front view as illustrated in FIG. 2. As illustrated in FIG. 13, a plurality of pins 160 substantially cover the area outside the dotted rectangle 125 and the area outside the dotted rectangle 135. The pins on the area outside the dotted rectangle 125 may correspond to a contacting structure and the pins on the area outside the dotted rectangle 135 may correspond to another contacting structure. In some embodiments, the area inside the dotted rectangle 125 and the area inside the dotted rectangle 135 are covered with a non-conductive layer. In some embodiments, the area outside the dotted rectangle 125 and the area outside the dotted rectangle 135 are not covered with a non-conductive layer. When the foldable mobile device as illustrated in FIG. 13 is folded, the pins on the first plate 123 and the pins on the second plate 133 may be connected with each other so that the first plate 123 and the second plate 133 are conductively coupled with each other.

Figure 14:
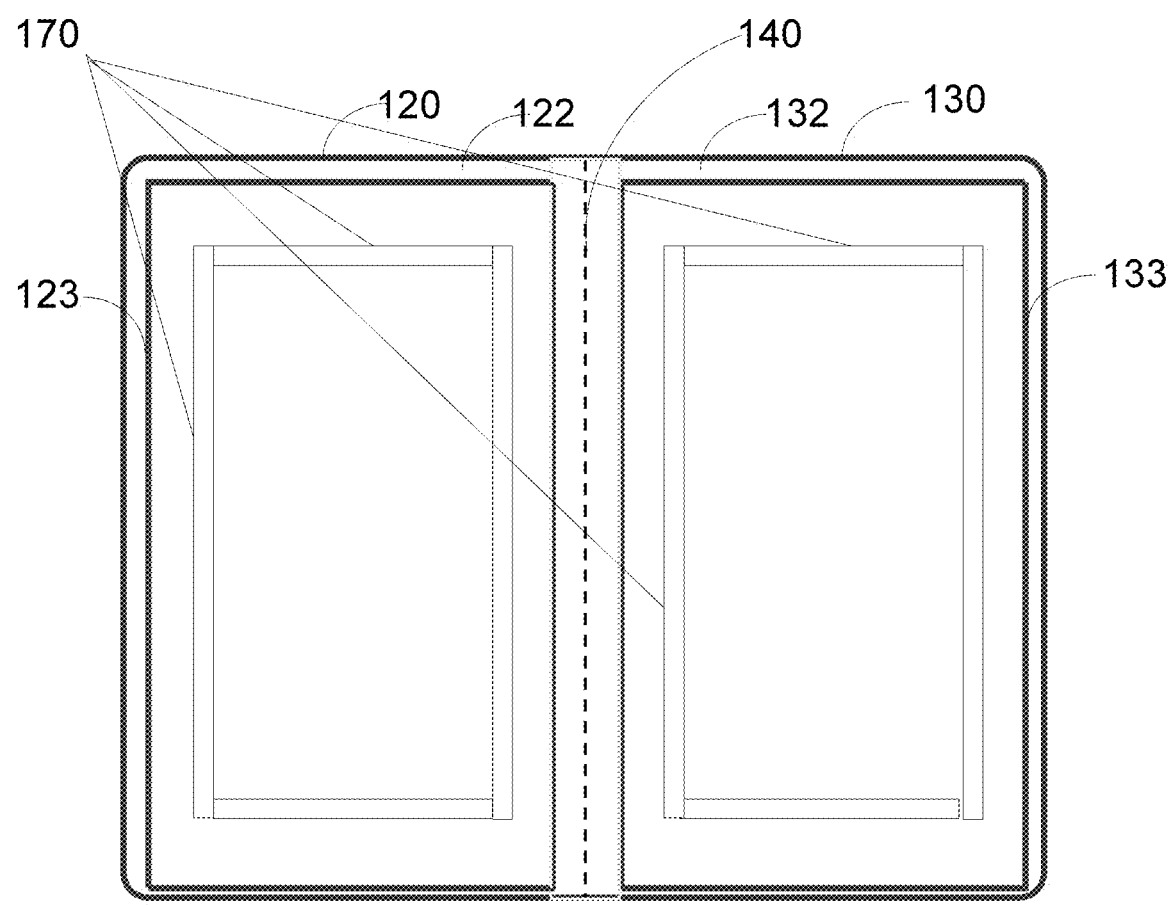
FIG. 14 illustrates a rear view of the foldable mobile device when it is unfolded according to an embodiment of the disclosure.

FIG. 14 illustrates a rear view of the foldable mobile device when it is unfolded according to an embodiment of the disclosure. When the foldable mobile device as illustrated in FIG. 14 is in the unfolded state, its front view may be the same as the front view as illustrated in FIG. 1. When the foldable mobile device as illustrated in FIG. 14 is in the folded state, its front view may be the same as the front view as illustrated in FIG. 2. As illustrated in FIG. 14, bars 170 are respectively defined on the first plate 123 and the second plate 133 as two contacting structures. The bars 170 are used to conductively couple the first plate 123 and the second plate 133 when the foldable mobile device is in the folded state. The one or more bars 170 are made of conductive material, such as metal. As illustrated in FIG. 14, the bars are defined on both the first plate 123 and the second plate 133. In some embodiments, one or more bars may be defined only on the first plate 123 or only on the second plate 133. In such a scenario, a conductive area may be defined on the other plate to conductively contact the bars so that the first plate 123 and the second plate 133 are conductively coupled with each other. As illustrated in FIG. 14, one or more bars 170 are arranged in a rectangle shape. In some embodiments, one or more bars 170 may be arranged in a circle, in an oval shape, in a triangle shape, in a pentagon shape or other applicable shapes. In some embodiments, the first plate 123 and the second plate 133 are substantially covered with a non-conductive layer. In some embodiments, a portion of the first plate 123 and a portion the second plate 133 are covered with a non-conductive layer while another portion of first plate 123 and another portion the second plate 133 are not covered with a non-conductive layer. In one example, the areas inside the rectangle shape are covered with a non-conductive layer while the areas outside the rectangle shape are not covered with a non-conductive layer. In another example, the areas outside the rectangle shape are covered with a non-conductive layer while the areas inside the rectangle shape are not covered with a non-conductive layer.

In some embodiments, two contacting structures (e.g. pins 160 or bars 170) of the mobile device are respectively configured to stay inside the two portions (e.g. 120, 130) of the mobile device when the mobile device is in the unfolded state. Furthermore, when the mobile device is in the folded state, the two contacting structures partially or substantially come outside the portions and contact each other, so that the first portion 120 and the second portion 130 are conductively coupled with each other. In some embodiments, one portion, such as portion 130, does not have the contacting structure. However, the portion, such as portion 130, has one or more contacting areas which are configured to conductively contact a contacting structure conductively coupling the other portion, such as portion 120, when the mobile device is folded. Thus, the two portions are still conductively coupled with each other when the mobile device is in the folded state.

Figure 15:
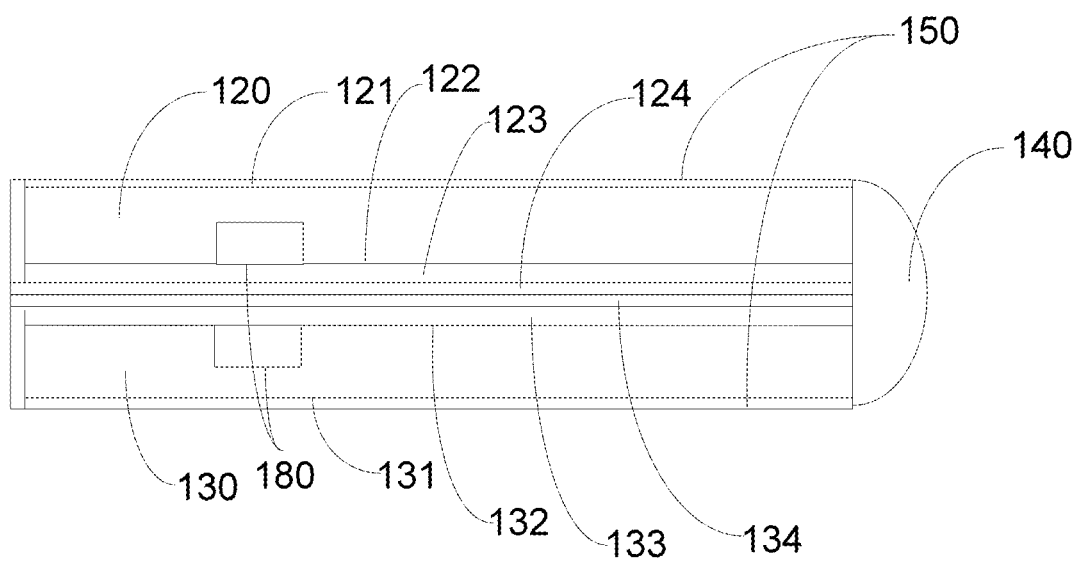
FIG. 15 illustrates a side view of a foldable mobile device when it is folded according to an embodiment of the disclosure.

FIG. 15 illustrates a side view of a foldable mobile device when it is folded according to an embodiment of the disclosure. When the foldable mobile device as illustrated in FIG. 15 is in the unfolded state, its front view may be the same as the front view as illustrated in FIG. 1. When the foldable mobile device as illustrated in FIG. 15 is in the folded state, its front view may be the same as the front view as illustrated in FIG. 2. As illustrated in FIG. 15, the foldable mobile device may be a mobile phone, a mobile tablet and any mobile foldable electronics device. The foldable mobile device has a housing having a first portion 120 and a second portion 130. The first and the second portions 120, 130 are foldable around a folding axis 140 of the housing. Based on rotation around the folding axis 140, the foldable mobile device may be folded or unfolded. The foldable mobile device further includes an antenna assembled to the housing. In some embodiments, the antenna may be assembled in the first portion 120 or the second portion 130, and may be assembled partially in the first portion 120 and partially in the second portion 130. In some embodiments, the antenna is assembled along one or more edges of the first portion 120, or along one or more edges of the second portion 130. Moreover, the foldable mobile device includes a flexible display 150 mounted on a front side 121 of the first portion 120 and a front side 131 of the second portion 130. The flexible display 150 may be based on an electronic ink display, an organic light-emitting diode display, or other suitable flexible displays. In some embodiments, the foldable mobile device has two separate display screens, flexible or inflexible, which are respectively mounted on the front side 121 and the front side 131.

The first portion 120 has a first plate 123 configured on a back side 122 of the first portion 120, where the first plate 123 is made of conductive material. In some embodiments, the front side 121 of the first portion 120 is substantially parallel with the back side 122 of the first portion 120. In some embodiments, the foldable mobile device 200 has a second plate 133 configured on a back side 132 of the second portion 130, where the second plate 133 is made of conductive material. In some embodiments, the front side 131 may be arranged to be substantially parallel to the back side 132 of the second portion 130. In some embodiments, each or either of the front surface of the first plate 123 and the front surface of the second plate 133 is substantially or partially covered with a non-conductive layer, where the layer covering the first plate 123 is a first non-conductive layer (first layer) 124 and the layer covering the second plate 133 is a second non-conductive layer (second layer) 134. A non-conductive layer covering an outer surface of a plate may be protective oxide layer preventing the plate from damage caused by physical damage.

In some embodiments, when the mobile device operates in a folded state, i.e., when the mobile device is folded, the first layer 124 and the second layer 134 are sandwiched between the first plate 123 and the second plate 133. A separation distance between the first plate 123 and the second plate 133 is configured to substantially limit the presence of electromagnetic lossy mode resonance for performance of the antenna. When the foldable mobile device is folded, the two non-conductive layers touch each other and the separation distance is substantially equal to the a sum of thickness of the first layer 124 and a value of thickness of the second layer 134. In some embodiments, the separation distance is no more than 0.1 mm or other applicable dimension configurations. In some embodiments, the separation distance is no more than 0.2 mm. In some embodiments, the separation distance is no more than 0.3 mm. When the separation distance is small, such as less than 0.1 mm, 0.2 mm or 0.3 mm, the first plate is so close to the second plate that the electromagnetic lossy mode resonance between the first plate and the second plate is mitigated. Consequently, the adverse effect caused by the lossy mode resonance to the performance of the antenna in the foldable mobile device is eliminated.

In some embodiments, as illustrated in FIG. 15, the first portion 120 and the second portion 130 respectively include a first magnet block 180 and a second magnet block 180, and the first magnet block 180 and the second magnet block 180 are configured to magnetically position the first plate 120 and the second plate 130 for the conductive coupling when the foldable mobile device is in the folded state.

Figure 16:
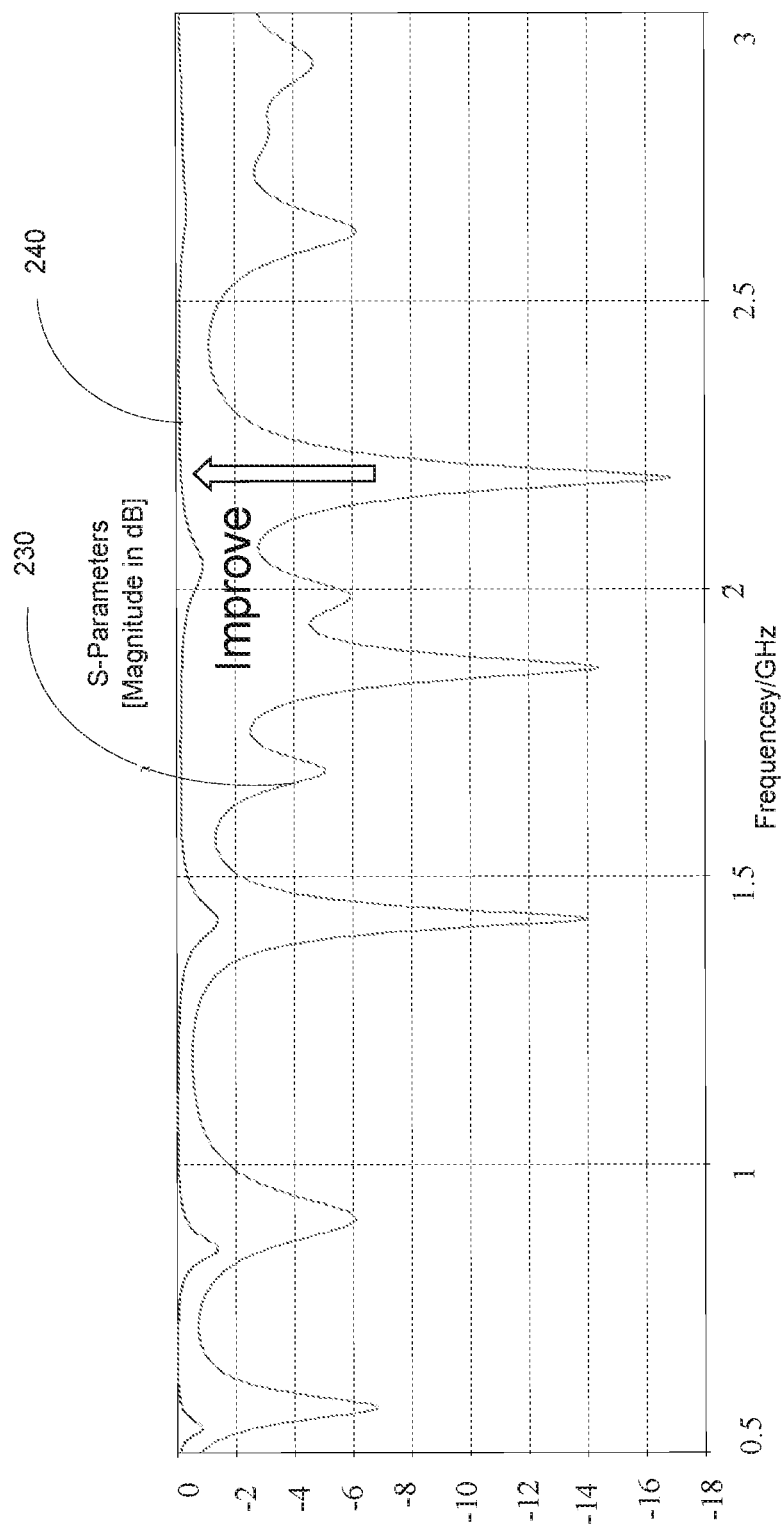
FIG. 16 illustrates exemplary effects of mitigated electromagnetic lossy mode resonance according to an embodiment of the disclosure.

FIG. 16 illustrates exemplary effects of the mitigated electromagnetic lossy mode resonance according to an embodiment of the disclosure. The electromagnetic lossy mode resonance measured in a mobile device without mitigation, such as shown in FIG. 3, is illustrated by line 230 and the mitigated electromagnetic lossy mode resonance measured in a mobile device with mitigation, such as shown in FIG. 15 is illustrated by line 240. As indicated in FIG. 16, the electromagnetic lossy mode resonance of the mobile device illustrated by FIG. 15 is sharply mitigated.

In some embodiments, the parts or elements in different figures but having same number may refer to the same part or element.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other mappings shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A foldable mobile device comprising:
a housing having a first portion and a second portion foldable around a folding axis of the housing to enable the foldable mobile device to be placed in a folded state;
an antenna operatively assembled to the housing; and
a display mounted on a front side of the first portion and a front side of the second portion, the first portion including a first plate disposed on a back side of the first portion opposite the front side of the first portion and a contacting structure, the second portion including a second plate disposed on a back side of the second portion opposite to the front side of the second portion, the contacting structure configured to form an electrically conductive connection between the first plate and the second plate upon the foldable mobile device being placed in the folded state, an outer surface of the first plate being at least partially covered by a first layer of electrically non-conductive material and an outer surface of the second plate being at least partially covered by a second layer of electrically non-conductive material.

2. The foldable mobile device of claim 1, wherein the contacting structure is configured to substantially protect the antenna from potential electromagnetic lossy mode resonance between the first plate and the second plate when the foldable mobile device is in the folded state.

3. The foldable mobile device of claim 1, wherein the contacting structure is configured to reduce the electromagnetic lossy mode resonance existing between the first plate and the second plate when the foldable mobile device is in the folded state.

4. The foldable mobile device of claim 1, wherein the first plate and the second plate are made of electrically conductive material.

5. The foldable mobile device of claim 1, wherein the display includes a flexible display having a first displaying area on the front side of the first portion and a second displaying area on the front side of the second portion, wherein the flexible display is configured to display content on both the first displaying area and the second displaying area when the foldable mobile device is in an unfolded state.

6. The foldable mobile device of claim 1, wherein the display includes two physically separate displaying screens.

7. The foldable mobile device of claim 1, wherein the display is physically visible from outside of the foldable mobile device when the foldable mobile device is in the folded state.

8. The foldable mobile device of claim 1, wherein the contacting structure includes a pattern of electrically conductive pins, wherein a distance between neighboring electrically conductive pins in the pattern of electrically conductive pins is less than a threshold distance.

9. The foldable mobile device of claim 8, wherein the threshold distance is 15 mm.

10. The foldable mobile device of claim 1, wherein the contacting structure includes one or more electrically conductive bars.

11. The foldable mobile device of claim 1, wherein an outer surface of the first plate is fully covered by the first layer of electrically non-conductive material and an outer surface of the second plate is fully covered by the second layer of electrically non-conductive material.

12. The foldable mobile device of claim 1, wherein the first plate at least partially covers the back side of the first portion and the second plate at least partially covers the back side of the second portion.

13. The foldable mobile device of claim 1, wherein the first portion and the second portion include a first magnet block and a second magnet block, respectively, the first magnet block and the second magnet block configured to magnetically position the first plate and the second plate such that the contacting structure forms the electrically conductive connection between the first plate and the second plate upon the foldable mobile device being placed in the folded state.

14. The foldable mobile device of claim 1, wherein the contacting structure is at least partially inside the first portion when the foldable mobile device operates in an unfolded state.

15. A foldable mobile device comprising:
a housing having a first portion and a second portion foldable around a folding axis of the housing to enable the foldable mobile device to be placed in a folded state;
an antenna operatively assembled to the housing; and
a display mounted on a front side of the first portion and a front side of the second portion, the first portion including a first plate disposed on a back side of the first portion opposite the front side of the first portion and a contacting structure connected to the first plate, the second portion including a second plate disposed on a back side of the second portion opposite to the front side of the second portion and an electrically conductive area connected to the second plate,
the contacting structure configured to contact the electrically conductive area to form an electrically conductive connection between the first plate and the second plate upon the foldable mobile device being placed in the folded state, each of the first plate and the second plate being at least partially covered by electrically non-conductive material.

16. The foldable mobile device of claim 15, wherein the electrically non-conductive material does not interfere with the contacting structure's formation of the electrically conductive connection between the first plate and the second plate upon the foldable mobile device being placed in the folded state.

17. The foldable mobile device of claim 15, wherein the contacting structure is configured to substantially protect the antenna from potential electromagnetic lossy mode resonance between the first plate and the second plate when the foldable mobile device is in the folded state.

18. The foldable mobile device of claim 15, wherein the contacting structure is configured to reduce the electromagnetic lossy mode resonance existing between the first plate and the second plate when the foldable mobile device is in the folded state.

19. The foldable mobile device of claim 15, wherein the first plate and the second plate are made of electrically conductive material.

20. The foldable mobile device of claim 15, wherein the contacting structure includes a pattern of electrically conductive pins, wherein a distance between neighboring electrically conductive pins in the pattern of electrically conductive pins is less than a threshold distance.

21. The foldable mobile device of claim 20, wherein the threshold distance is 15 mm.

22. The foldable mobile device of claim 15, wherein the contacting structure includes one or more electrically conductive bars.

* * * * *